(12) United States Patent
Smith

(10) Patent No.: US 6,269,288 B1
(45) Date of Patent: *Jul. 31, 2001

(54) SMART SWITCH

(75) Inventor: Robert L. Smith, Milpitas, CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/688,237

(22) Filed: Jul. 29, 1996

Related U.S. Application Data

(63) Continuation of application No. 08/183,196, filed on Jan. 14, 1994, now abandoned.

(51) Int. Cl.[7] .................................................... G06F 1/26
(52) U.S. Cl. .................................... 700/295; 713/310
(58) Field of Search .................................... 364/492–493, 364/483, 707, 528.21, 528.27, 528.3; 307/64, 66, 125; 323/909; 340/870.02, 825.06, 825.18, 825.31; 361/72; 395/750.01, 750.02; 379/102.01, 102.04; 713/300, 322, 340, 310; 700/295

(56) References Cited

U.S. PATENT DOCUMENTS

| | | | |
|---|---|---|---|
| 4,740,883 | * | 4/1988 | McCollum ........................ 364/483 X |
| 4,747,041 | * | 5/1988 | Engel et al. ...................... 364/492 X |
| 5,012,233 | | 4/1991 | Poulsen, Jr. ...................... 340/825.18 |
| 5,191,323 | * | 3/1993 | Abbes et al. . |
| 5,198,806 | * | 3/1993 | Lord ................................. 340/825.31 |
| 5,289,045 | * | 2/1994 | Lavin et al. ............................ 307/64 |
| 5,347,167 | * | 9/1994 | Singh ................................... 364/493 |
| 5,396,636 | * | 3/1995 | Gallagher et al. .................... 395/750 |
| 5,404,541 | * | 4/1995 | Hirosawa et al. .................... 395/750 |
| 5,450,334 | * | 9/1995 | Pulizzi et al. . |
| 5,506,790 | * | 4/1996 | Nguyen ................................ 364/492 |
| 5,659,800 | * | 8/1997 | Zhang et al. . |
| 5,704,040 | * | 12/1997 | Gunjii . |

FOREIGN PATENT DOCUMENTS

| | | |
|---|---|---|
| 0 373 278 | 12/1988 | (EP) . |
| 0 508 685 | 4/1992 | (EP) . |
| WO-A-93 19415 | 3/1993 | (WO) . |

OTHER PUBLICATIONS

"PowerChute Plus", APC, Jan. 1995, (Sales Brochure).
"Smart Socket+", PowerEdge, Jan. 1995, (Sales Brochure).
"IPS–110", Lode Star Technologies, May 22, 1995, p. 120, Computer World Magazine.
"IPC 3100", Pulizzi Engineering, Inc., 1993, (Sales Brochure).
"Reboot II", Cybex, 1994, (Sales Brochure).
"Sentry Remote Power Manager", Server Technology, Aug. 1, 1994, (Sales Brochure).
"TB–450", U.S.A. Communications Corp., Jul. 10, 1995, (Sales Brochure).

* cited by examiner

Primary Examiner—M. Kemper
(74) Attorney, Agent, or Firm—Conley, Rose & Tayon, PC; Robert C. Kowert

(57) ABSTRACT

An apparatus and method for enabling remotely controlling power status of a remote device. The apparatus monitors information signals being transmitted to the remote device and from such information, determines whether to alter the power status of the remote device. The apparatus may include an uninterruptable power source to enable such remote control during an interrupt of main power to the apparatus.

19 Claims, 5 Drawing Sheets

SMART SWITCH

This is a Continuation Application of application Ser. No. 08/183,196, filed Jan. 14, 1994 now abandoned.

BACKGROUND OF THE INVENTION

1. Field of the Invention

The present invention relates to an apparatus and method for managing power conditions of a computer system. More specifically, the present invention relates to an apparatus coupled to a communication line to remotely control a power status of a remote device and a method for performing such remote power management.

2. Background of the Field

Throughout the last decade, business have realized that a networked system incorporating a desired number of workstations and at least one server is generally more cost effective than purchasing the desired number of stand-alone computers, each of which having a large internal memory. The networked system is typically a number of servers (e.g., computers, workstations, etc.) coupled through a communication line, such as a dedicated RS 232 line, to at least one server node. Hereinafter, a "server node" refers to any device which typically operates in cooperation with a server, including but not limited to a host server.

One problem associated with networked systems employing server nodes being large in size is that the server nodes are typically stored in remote computer rooms within the same building or perhaps even miles away, causing support difficulties. Thus, in order to control power consumption of the server nodes and to reboot server nodes if any of them have "frozen", support personnel had to physically "power-off" or "power-on" these server nodes. This support technique was not cost-effective because many support personnel are needed in order to support a multiple building corporation having tens or hundreds of server nodes. Moreover, it is time consuming for the support personnel to physically power-off or power-on the server nodes.

Recently, a company designed a conventional power switch (hereinafter referred to as the "IPC 3100") as shown in FIG. 1. The IPC 3100 1 is designed to remotely supply 110 volts of AC power ("110 VAC") through each of its four power outlets 2a–2d for use by a single host server as illustrated or up to four host servers. The IPC 3100 1 is powered by a conventional 110 VAC power supply 3 which is connected to the IPC 3100 1 through an AC power connection cord 4. The IPC 3100 1 transfers the 110 VAC to the host server 5 through at most four corresponding power connection signal lines of which only three lines 6b–6d are shown. Therefore, the IPC 3100 1 is incapable of supporting host servers having power requirements different than 110 VAC, such as 220 VAC and non-domestic voltage levels.

In a conventional networking scheme, a first serial port 8 of a terminal (i.e., console) server 7 is coupled to a first serial port 9 of the host server 5 through a first serial communication line 10, usually a RS 232 signal line. To install the IPC 3100 1 within the conventional networking scheme, new hardware is typically needed because the console server 7 requires a second serial port 11 for electrically connecting the IPC 3100 1 to the console server 7. Therefore, installation of the IPC 3100 1 is typically extremely difficult and costly to perform because the console server 7 normally does not have the unused second serial port 11. Even if the console server 7 has the unused second serial port 11, installing the IPC 3100 1 would require the serial port 11 of the console server 7 to be reprogrammed.

The next step for implementing the IPC 3100 1 is to install a second dedicated serial communication line 12 in order to electrically couple the console server 7 to the IPC 3100 1.

A final step for implementing the IPC 3100 1 is that support personnel must re-route each of the power connection signal lines 6b–6d which are directly coupled to the host server 5. For companies having tens or hundreds of console and host servers, purchasing, implementing and re-routing the above-indicated signal lines can be a costly and time consuming process.

As briefly alluded to above, there are many disadvantages associated with the IPC 3100. A first disadvantage is that the IPC 3100 is extremely difficult to install, and in some case, impossible to install. A second disadvantage is that the IPC 3100 is expensive to install. As discussed above, the IPC 3100 does not fully utilize existing hardware, but rather, requires additional hardware to be installed, if at all possible. As a result, implementing the IPC 3100 is costly in view of additional material costs (cables, serial ports, etc.) and labor costs associated with installation, especially for companies having tens or hundreds of host servers.

A third disadvantage is that the IPC 3100 has no power outage management features. The IPC 3100 1 is solely AC powered. In the event of a sudden power-outage, there would be no remote access to the host servers because no AC power would be available to the IPC 3100. The lack of remote access would require support personnel to physically power-off the host servers until power was restored. This lack of remote access during power outages subjects the host-server to severe damage if it experiences an electric spike. Although support personnel may be able to quickly reach a few host servers to protect them from potential damage, it is highly doubtful that the support personnel would be able to power-off every host server in the event that the electric spike occurs.

Another disadvantage is that the IPC 3100 can not be used to remotely control computers that do not require power other than 110 VAC. Therefore, the IPC 3100 does not support a wide range of computer systems.

Another disadvantage is associated with the IPC 3100 is that it functions at a slow baud rate of 2400 bps. Therefore, for a majority of machines capable of operating at a greater baud rates, the IPC 3100 would require limitations in the networked system's communication speed.

Furthermore, the IPC 3100 fails to provide a feature to effectively prevent users from remotely altering the power status of the host server while the host server is being repaired. Of course, this could be done by unplugging the second dedicated serial communication line, but then, there poses risks of damaging the serial port, the dedicated serial communication line itself as well as exposing the support personnel to difficulties in re-connecting the second dedicated serial communication line.

SUMMARY OF THE INVENTION

In light of the foregoing, it will be apparent from the below description that the present invention overcomes the above-mentioned disadvantages and limitations associated with the conventional prior art power switches by remotely managing power to a remote device by tapping a pre-existing communication line coupling a remote device to another device without additional reconfiguration of a networked system.

The apparatus comprises a serial port circuit which receives information from and transmits information onto the first serial communication line in order to monitor communication activity directed toward the remote device. The apparatus further comprises a processing unit which determines whether a request, such as a predetermined sequence, has been transmitted to the remote device. If so, the processing unit alters the power status of the remote device by generating and transmitting a control signal to a switch control circuit. The switch control circuit will, in turn, activate or deactivate the remote device.

BRIEF DESCRIPTION OF THE DRAWINGS

The objects of the present invention will be described with respect to the following figures in which.

DETAILED DESCRIPTION OF THE INVENTION

A remote power controller and method are described which can be used to remotely control power application to a host computer. In the following description, numerous specific details are set forth, such as the specific circuit components of the present invention. It is apparent, however, to one skilled in the art that the present invention may be practiced without incorporating the specific circuit components. Moreover, a specific example has been created for the sole purpose of illustrating the operations of the present invention. This specific example lends itself to only explaining the operation of the present invention and should not be construed in any way as a limitation on the scope of the present invention.

Figure 2:
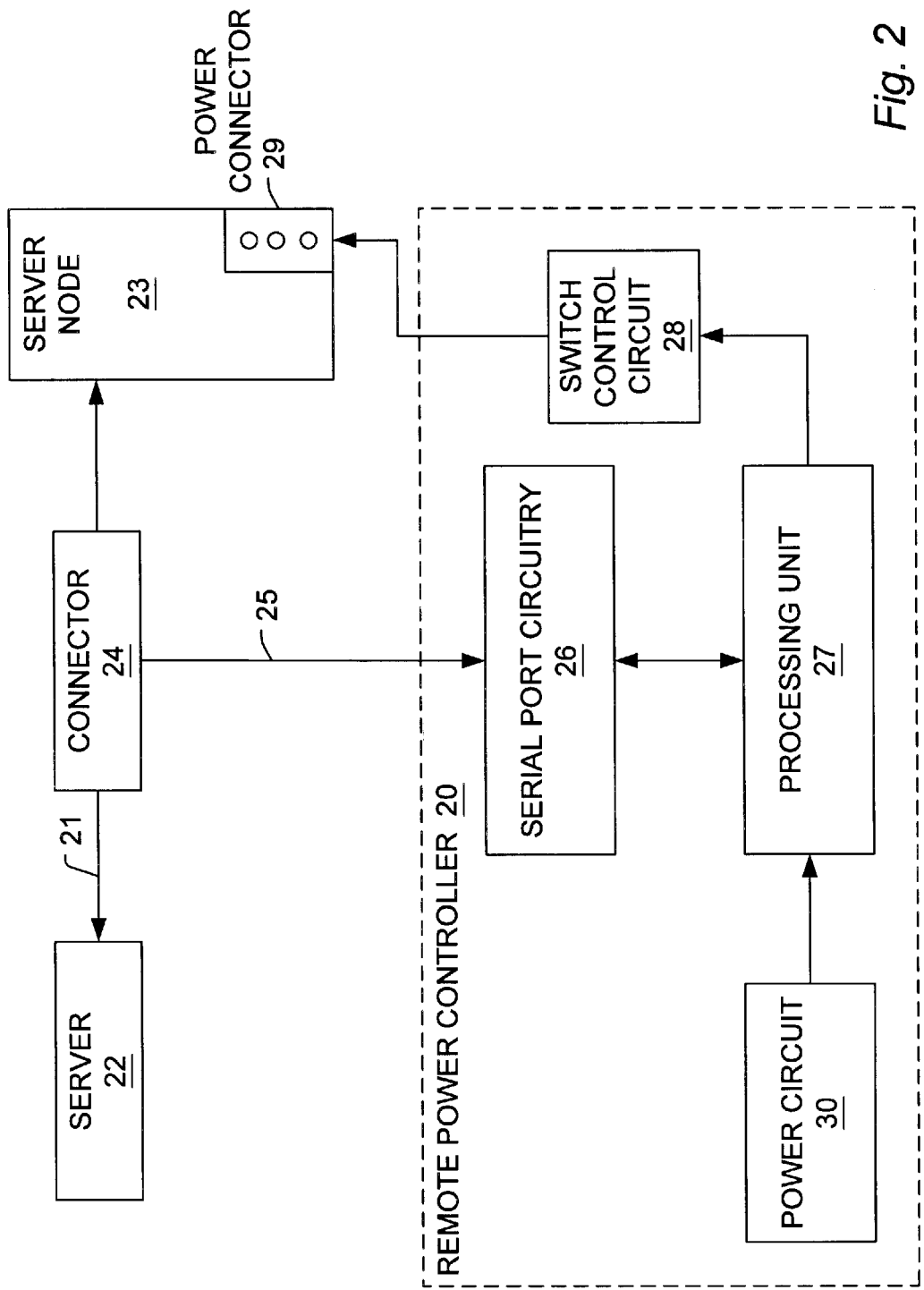
FIG. 2 is a block diagram of a networked system incorporating the present invention coupled to a communication line enabling communication between a server and a server node.

FIG. 2 illustrates one embodiment of the remote power controller employed within a conventional networked computer system. The remote power controller 20 is coupled to a main communication signal line 21 typically pre-existing in the conventional networked computer system. The main communication signal line 21 couples a first and second devices together, namely, a server 22 and a server node 23. However, such devices could be any pair of devices wherein the server 22 has remote access to the server node 23 having a power connector 29, such as a modem and a host server, two host servers, a computer and a host server and the like.

The remote power controller 20 is coupled to the main communication line 21 through a connector 24 and a second communication signal line 25 having a configuration identical to the main communication signal line 21.

The connector 24 and second communication signal line 25 enable an information signal generated by the server 22 to be received by the server node 23 and the remote power controller 20. Although illustrated as external to the remote power controller 20, the connector 24 and second communication signal line 25 could be incorporated within the power controller 20, eliminating a need for the second communication line 25 itself.

Figure 1:
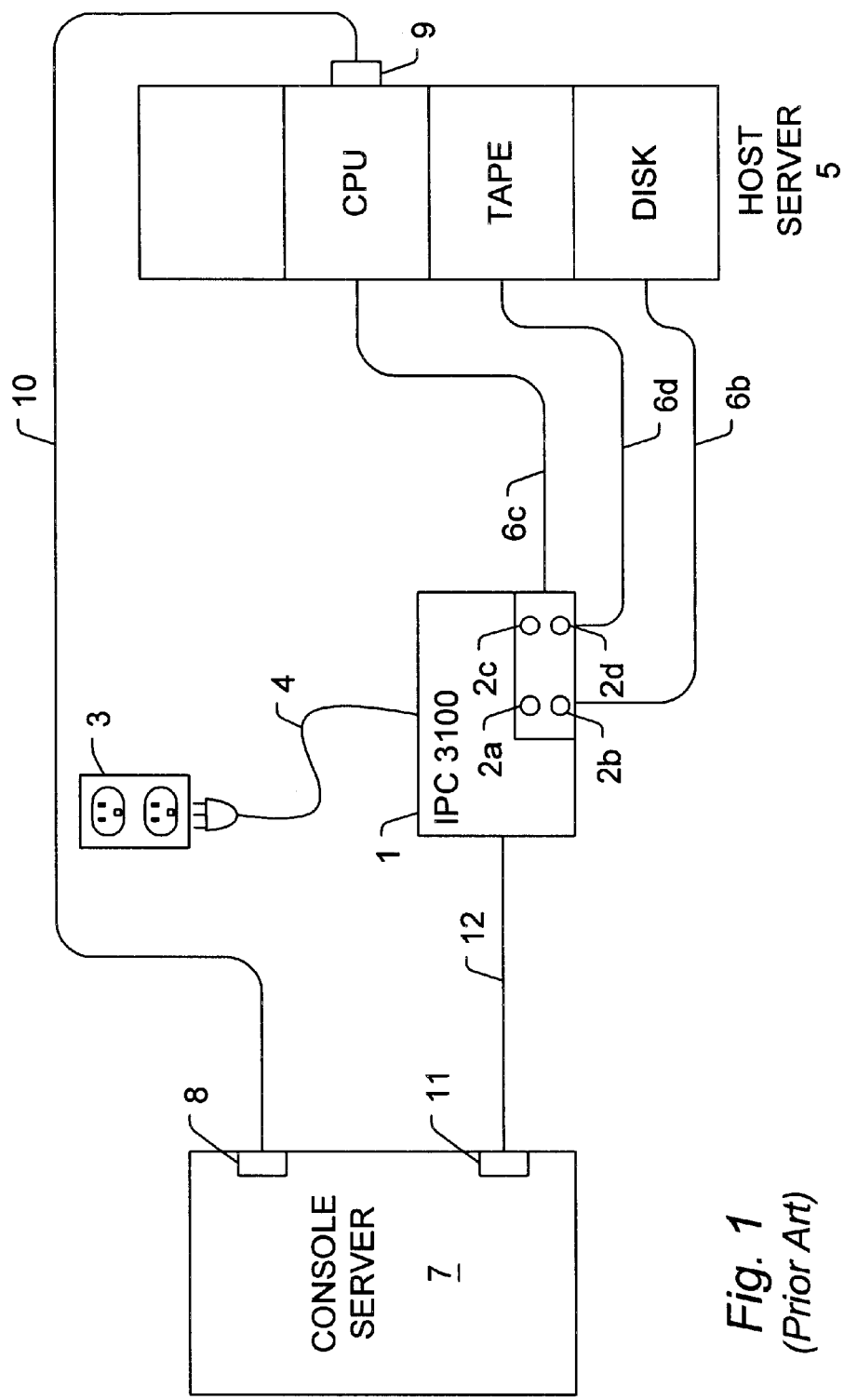
FIG. 1 is a block diagram of a conventional prior art remote power controller, namely a IPC 3100, operating as a power switch for a host server.

In FIG. 2, the second communication line 25, which has an arbitrary length but less than the second dedicated serial communication line 12 shown in FIG. 1, is coupled to serial port circuitry 26 which receives information placed on the main communication signal line 21, converts the information from RS 232 voltage levels to TTL voltage levels if the main communication line 21 is a RS 232 line, and drives the information into a processing unit 27. Upon receipt of information formulating a predetermined sequence of character values, the processing unit 27 will generate a control signal to a switch control circuit 28 to activate or deactivate a power connector 29 of the server node 23 in order to power-on or power-off the server node. Alternatively, of course, the server node 23 could be powered-on/powered-off by deactivating/activating the power connector 29 if the configuration of the power controller so dictates.

Figure 3:
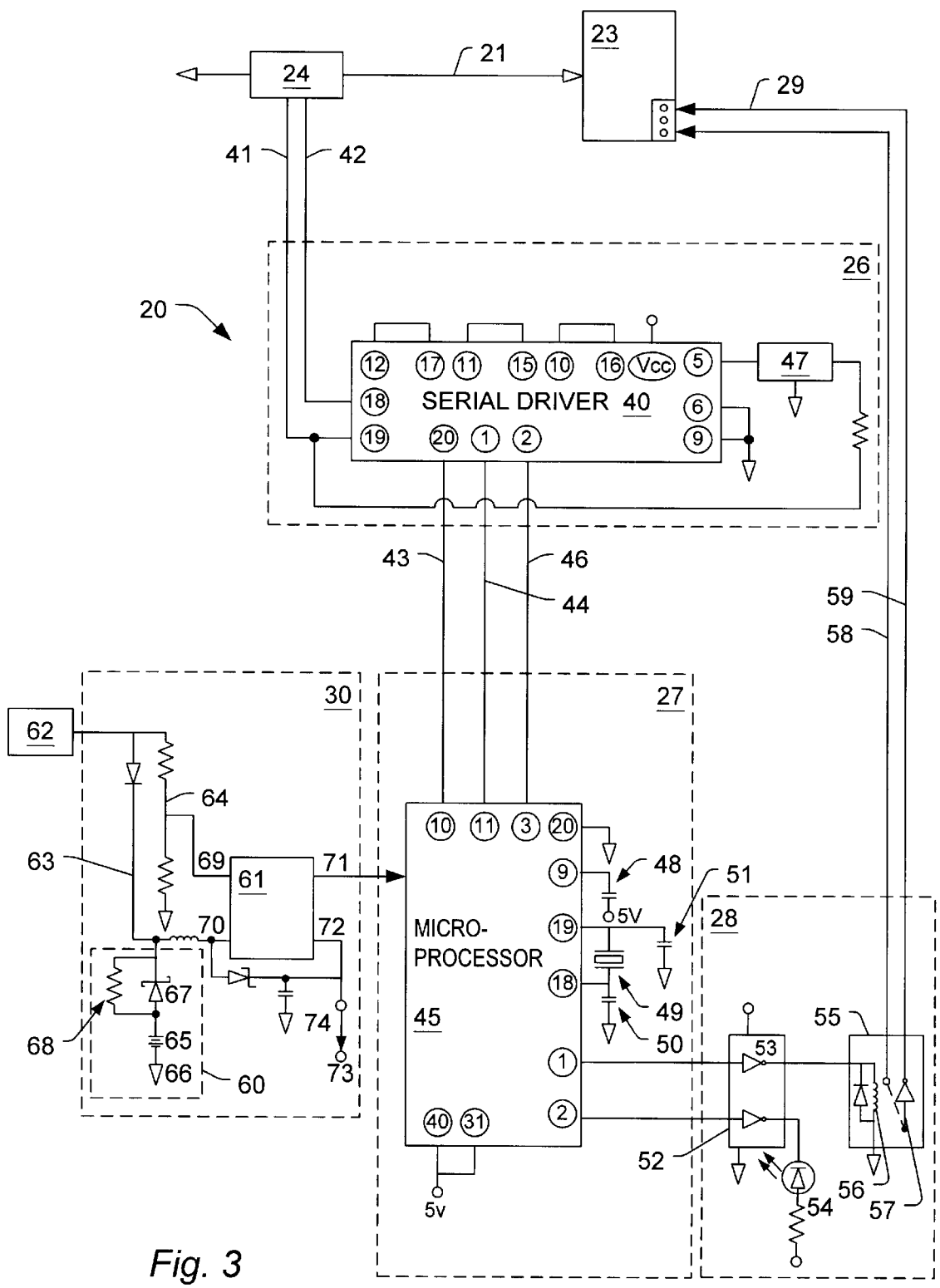
FIG. 3 is a more detailed circuit block diagram of one embodiment of the present invention.
Figure 5:
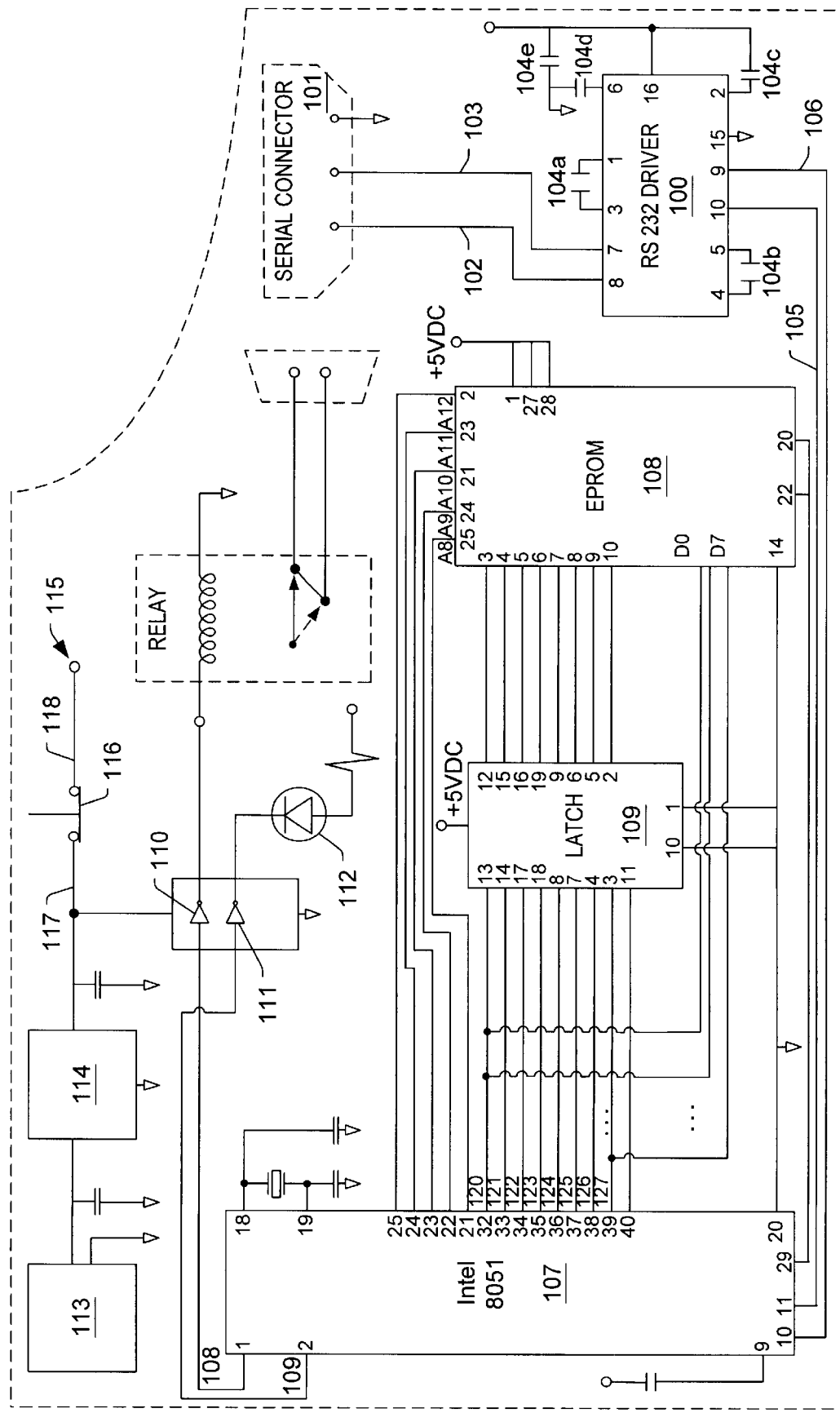
FIG. 5 is a detailed circuit block diagram of a second embodiment of the present invention.

In the embodiments illustrated in FIGS. 3 and 5, the power connector 29 comprises a multi-pin interface being an industry standard utilized by many computer technology manufacturers, including Sun Microsystems, Inc. of Mountain View, California. This interface requiring three wires, wherein a maintained closure between pins 1 (top) and 3 (bottom) of the power connector 29 will remotely power-on the server node 23 and a maintained opening of these pins will remotely power-off the server node 23. Pins 1 and 2 have open circuit voltages of +12 VDC and pin 3 is chassis ground. However, it is contemplated that any power controller could be used to perform the same function of turning off or on the server node 23 upon detection of a control signal.

The processing unit 27 is further coupled to an uninterruptable 5-volt power circuit 30 to provide the processing unit 27 with an alternate power supply in case its main power supply is disconnected. The processing unit 27 typically obtains its main power from a keyboard port or an AC adapter on the server node 23.

In the above-illustrated embodiment, the power controller 20 is able to support server nodes requiring any preselected amount of voltage power (e.g., 220 volts) since the power controller 20 directly turns off the power connector of the server node itself. In contrast, the conventional prior art power switch directly provides 110 VAC to the server node 23. In addition, the remote power controller 20 operates at a baud rate of 9600 bps, supporting faster communication systems.

As previously mentioned, the operations of the present invention may best be described through a simple example. This example merely assists in explaining the operation of the present invention, and should in no way be construed as a limitation on the scope of the present invention. Suppose the remote power controller 20 is designed so that it powers-off the server node 23 upon detection of a "control GOFF" (i.e., a sequence of <Cntl G> <Cntl O> <Cntl F> <Cntl F>) on the main communication signal line 21 and powers-on the server node 23 upon detection of a "control GON". The remote power controller 20 is coupled to he main communication signal line 21 through second communication signal line 25 or any similar material in order to monitor the main communication signal line 21.

Upon detection of the "control GOFF" sequence, the processing unit 27 causes the switch control circuit 28 to generate a control signal into the power connector 29 so that the server node 23 powers-off. Similarly, the detection of a "control GON" will cause the remote power controller 20 to power-on the server node 23. In case of a "control GON" or "control GOFF" is detected when the server node 23 is powered-on or powered-off respectfully, no change in power status will occur.

Referring now to FIG. 3, a detailed circuit diagram of the present invention is illustrated. However, it is contemplated that the present invention could be designed with other comparable chips. As shown in FIG. 3, the present invention comprises the connector 24, serial port circuitry 26, processing unit 27, switch control circuit 28 and the uninterruptable power circuitry 30. The connector 24, preferably an industry standard RJ-11 or DB-25F connector, is coupled to the main communication signal line 21 and the serial port circuitry 26. The coupling between the connector 24 and the serial port circuitry 26 includes a pair of serial port signal receive and transmit lines 41 and 42 to allow the serial port circuitry 26 to receive data from and transmit data onto the main communication signal line 21.

The serial port circuitry 26 comprises a serial driver chip 40 to transmit the data signals to a microprocessor 45. The serial driver chip 40 in this embodiment is a RS 232 driver chip, namely a 20-pin MAX233 manufactured by Maxim Corporation, in view of the fact that typical conventional networks employ RS 232 communication lines. It is contemplated that any other appropriate serial driver chip could be used to provide the same functionality.

The driver chip 40 is configured in a manner illustrated in FIG. 3 so that external capacitors are not required to increase voltage to ±10 volts, namely the RS 232 voltage level, making the remote power controller 20 easier to construct. Although the embodiment illustrates two separate signal lines 41 and 42 to receive and transmit data, respectively, only one signal line is actually required for unidirectional communication since the serial port transmit signal line 42 is only used for sending information regarding the communications to an operator.

The serial port receive signal line 41 is further coupled to a negative voltage regulator 47 which provides negative voltage to prevent unintended break sequences. For certain older server nodes, negative voltage reapplied to the serial port receive signal line 41 after a negative voltage loss for a duration of at least one second, will cause the server node to abort its currently running program. This type of abort is not a genuine break sequence since it is not intended. By the negative voltage regulator 47 holding a negative five volts on the serial port receive signal line 41, the serial port receive line 41 will remain at a negative voltage, preventing unintended break sequences while allowing normal serial communication to still occur.

The driver chip 40 includes a pair of TTL level transmit and receive signal lines 43 and 44 coupled to the microprocessor 45 and a power conversion signal line 46 used to convert a positive five volt voltage into an appropriate negative voltage on pin 5 of the serial driver 40. This pair of transmit and receive signal lines 43 and 44 provides the microprocessor 45 necessary information, such as character values, from which it can determine whether to power-off or power-on the server node 23.

The microprocessor 45 is preferably, but not required to be, a low power microprocessor such as Intel ™ 87C51, a Dallas Semiconductor DS5000 and the like. A low power consumption microprocessor is preferred, but not required, since the microprocessor 45 needs to operate under battery power during a power outage.

As shown in FIG. 3, the Intel ™ 87C51 is featured as the microprocessor 45 to illustration one of many possible embodiments. In the Intel ™ 87C51, pin 40 and pin 31 of the microprocessor 45 are tied together and powered by 5 volts. Pin 20 is a ground pin which is connected to ground while pin 9 is a reset pin which is coupled to a 5 volt supply using capacitor 48 to provide a power-on reset. Pins 18 and 19 are coupled to an oscillating crystal 49 for clocking the microprocessor 45. The microprocessor 45 can operate with clock frequency ranges between 3 and 12 MHz, but for the preferred embodiment, the crystal 49 has a frequency of approximately 11 MHz. Capacitors 50 and 51 are also coupled to pins 18 and 19 to provide oscillation of the crystal 49.

Port pin 1 of the microprocessor 45 is coupled to an inverter 53 and a relay 55 in series. When the port pin 1 is "high," the power connector 29 of the server node 23 is powered-on because there exists a coupling between a relay switch 57 and a power-on signal line 58. However, when port pin 1 is "low", the relay switch 57 is coupled to the power-off signal line 59. Port pin 2, on the other hand, is coupled to a diagnostic LED 54 that will be on/off when the server node 23 is powered-on/powered-off, respectively. The LED 54 is just a visual aid to help identify the power status of the server node 23 or to identify problems with the remote power controller 20.

In FIG. 3, the uninterruptable power supply circuitry 30 includes a battery source 60 coupled indirectly to an AC-to-DC converter 61. The remote power controller 20 is coupled to any port, adapter and the like providing five volts, including but not limited to, an AC adapter or a keyboard port 62 on the server node 23 as shown in FIG. 3. The keyboard port 62 is coupled to the AC-to-DC converter 61 through two leads 63 and 64, wherein the first lead 63 is coupled to the battery source 60. The battery source 60 comprises a nickel cadmium cell(s) ("NiCad") battery 65 coupled between ground 66 and a Schottky diode 67 having a 680 Ω resister 68 in parallel with the Schottky diode 67. The resistor 68 will keep the NiCad battery 65, or the rechargeable battery of the user's choice, charged (i.e., trickle charged). When the five volts is provided by the keyboard port 62, no power is needed from the NiCad battery 65. Instead, the battery 65 is trickle charged so that a small amount of current is used to keep the batteries fully charged.

The AC-to-DC converter 61 has dual inputs 69 and 70 and dual outputs 71 and 72. A first output 71 is coupled to the microprocessor 45 in which the first output indicates whether the battery source 60 is falling below a predetermined level so as to allow the microprocessor 45 to perform certain "housekeeping" functions in order to prepare the microprocessor 45 for a cessation of power. A second output 72 of the AC-to-DC converter 61 is coupled to a five-volt power bus 73 which provides necessary voltage to drive the circuitry throughout in the remote power controller 20. Coupled between the second output 72 and the power bus 73 is a maintenance lock out switch 74 which, when closed as shown, enables power to be supplied to the serial port circuitry 26, processing unit 27 and the switch control circuit 28 within the remote power controller 20. However, if the maintenance lockout switch 74 is disconnected, the power in each of the circuits would be disconnected so that remote control of the power status of the host server would be inoperative.

Figure 4:
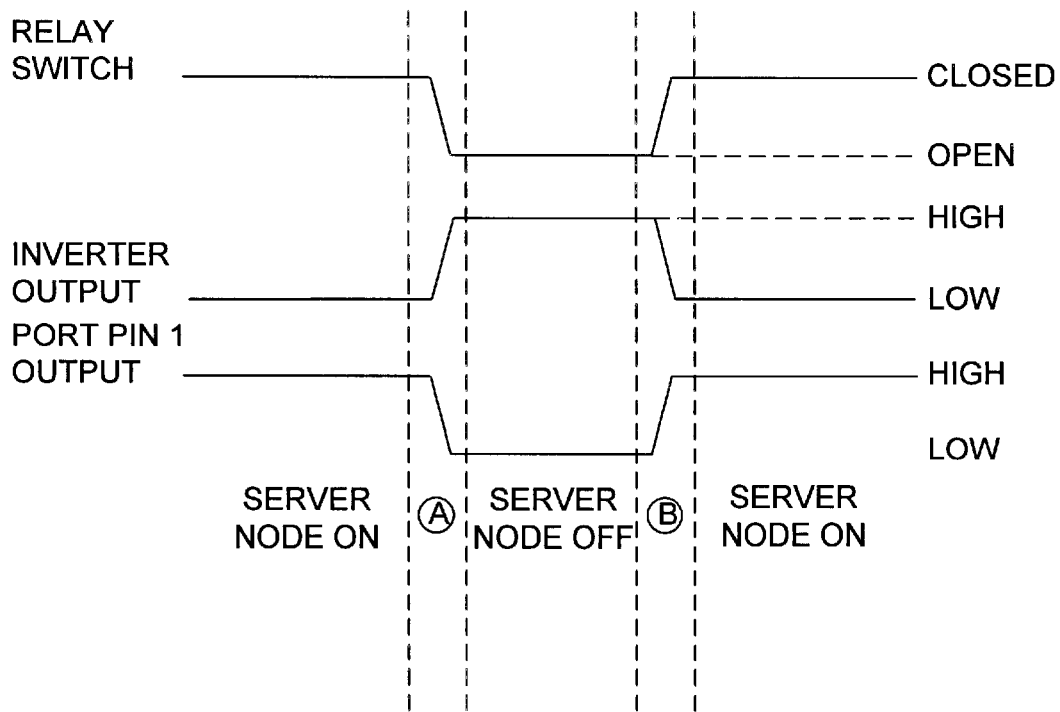
FIG. 4 is a timing diagram of the operation of a relay switch in the embodiment illustrated in FIG. 3 based on a specific output of a processing unit.

Referring to FIGS. 3 and 4, the output of the relays is disclosed in a time diagram. By default, the port pin 1 of the microprocessor 45 is active ("high") on a power-on. This drives the inverter 53 within an inverter chip 52 low so that no voltage is present on a coil 56 of the relay 55. Thus, a relay switch 57 is normally closed so that in the absence of voltage, the server node 23 remains powered-on. When a power-off command is issued, the port pin 1 goes low, which drives the inverter 53 high. As a result, the coil 56 is energized to drive the relay switch 57 to its open position, as illustrated by ghost lines, coupling the relay switch 57 with the power-off signal line 59. In the open position, the host server is powered-off. Conversely, when the power-on command is issued, the port pin 1 goes high, the inverter 53 goes low, the relay switch 57 is closed coupling itself to the power-on signal line 58 to apply power to the server node 23. It is contemplated that the switching mechanism could be designed with a single control signal line in combination with certain conventional control logic being coupled to the power connector 29.

Referring to FIG. 5, a second embodiment of the present invention is illustrated. In this embodiment, a RS 232 driver 100 is coupled to the connector 101 of the main communication signal line similar to the embodiment shown in FIG. 3 through a pair of receiving and transmitting signal lines 102 and 103. Unlike the RS 232 driver 40 such as, for example, the MAX233 driver in FIG. 3, the RS 232 driver 100 shown in FIG. 5 requires external capacitors 104a–104c for use by a charge pump internal to the MAX233 driver chip to increase the voltage from five volts to a requisite ± 10 volts for RS 232 application. The RS 232 driver 100 is coupled to microprocessor 107 through a pair of transmitting and receiving output signal lines 105 and 106.

The microprocessor 107 illustrated in FIG. 5, preferably an Intel ™ 8051 microprocessor, is different from the Intel ™ 87C51 microprocessor illustrated in FIG. 3 in that the Intel ™ 8051 (hereafter referred to as "the microprocessor 107") requires an external EPROM 108 for programming purposes. The combination address and data lines 120–127 of the microprocessor 107 are coupled to an eight bit latch 109 which simply acts as an intermediate chip in order to store the address information for use during the data cycle. The eight bit latch 109 is commonly used to store such data because the address lines are also used as data lines during subsequent clock cycles. This address information is stored for use by the memory chip during these subsequent clock cycles. The eight bit latch 109 enables one to store address information so that it can be used subsequent to the current clock cycle. This allows the external EPROM 108 to decode the address and put the data on the data lines when a signal line from pin 40 of the microprocessor 107 is activated.

As in the previous embodiment the microprocessor 107 is coupled through dual signal lines 108 and 109 to a pair of inverters 110 and 111 such that a second signal line 109 is used to activate or deactivate an LED 112 in order to indicate power status or problems with the system, while first output 108 is used to power on or off the server node.

Power is provided to the above-identified circuits through an AC adapter 113. Here, in this embodiment, there is no implementation of an uninterruptable voltage supply; rather, the voltage is obtained by the AC adapter 113 which is coupled to a voltage regulator 114 used to alter the twelve volts inputted therein to a five volt output. The voltage regulator 114 is coupled to a micro-controller power bus 115 which provides power to the microprocessor 107, the eight bit latch 109, the EPROM 108 and the RS 232 driver 100. Interposed between the output of the voltage regulator 114 and the micro-controller power bus is a maintenance lockout switch 116 which disables power to the above-identified circuitry when disconnecting lines 117 and 118. As a result, remote access to the server node to vary the power status is discontinued.

The present invention described herein may be designed in many different methods and using many different components. For example, it is contemplated that a receiver could be employed to detect radio transmissions between a first and a second device for power controlling reasons. While the present invention has been described in terms of various embodiments, other embodiments may come to mind to those skilled in the art without departing from the spirit and scope of the present invention. The invention should, therefore, be measured in terms of the claims which follow.

What we claim is:

1. A power control system adapted for connection to a pre-existing serial communication signal line for controlling power supplied to a first device which receives serial information signals from a second device through the pre-existing serial communication signal line, wherein the first device is enclosed in a first housing and the second device is enclosed in a second housing separated by a distance from the first housing, said power control system comprising:

a connector adapted for connection to said pre-existing serial communication signal line, wherein said connector includes a first signal path to allow the serial information signals to propagate from the second device to the first device, and wherein said connector includes a second signal path configured to provide a duplicate copy of the serial information signals;

a serial port receiver circuit coupled to the second signal path of said connector for receiving the duplicate copy of the serial information signals;

a processor coupled to the serial port receiver circuit and configured to monitor the duplicate copy of the serial information signals to thereby detect a predetermined serial control sequence; and a switch control circuit for controlling a switching of power within said first device, wherein said switch control circuit is coupled to said processor and is configured to generate a control signal to selectively power-on said first device in response to said processor detecting said predetermined serial control sequence, wherein said serial port receiver circuit, said processor, and said switch control circuit are contained in a third housing separate from the first and second housings, and wherein power for powering said first device is not propagated through said third housing.

2. The power control system as recited in claim 1, wherein the first device includes a power connector.

3. The power control system as recited in claim 2, wherein the switch control circuit alters the power status of the first device by altering a state of the power connector.

4. The power control system as recited in claim 3, wherein the switch control circuit includes a relay switch alternatively coupled to a first signal line and a second signal line coupled to the power connector of the first device, wherein the relay switch allows a predetermined voltage applied to the first signal line to power-on the first device and the relay switch allows the predetermined voltage to be applied to the second signal line in order to power-off the first device.

5. The power control system as recited in claim 1, wherein the serial port receiver circuit further converts the serial information signals to voltage levels readable by the processor.

6. The power control system as recited claim 5 further comprising a power source coupled to provide power to said processor.

7. The power control system as recited in claim 3, wherein the power source includes a nickel cadmium cell coupled to an AC-to-DC converter.

8. The power control system as recited in claim 7 wherein the power source further comprises a maintenance lockout switch for disabling the power control system from controlling the power supplied to said first device.

9. A networked computer system comprising:
   a workstation;
   a host server coupled to said workstation by a pre-existing serial communication line and configured to receive serial information signals from said workstation, wherein the host server is enclosed in a first housing and the workstation is enclosed in a second housing separated by a distance from the first housing; and
   a power controller adapted for connection to the pre-existing serial communication signal line for controlling power supplied to the host server, said power controller includes:
      a connector adapted for connection to the pre-existing serial communication signal line, wherein said connector includes a first signal path to allow the serial information signals to propagate from the workstation to the host server, and wherein said connector includes a second signal path configured to provide a duplicate copy of the serial information signals;
      a serial port receiver circuit coupled to the second signal path of said connector for receiving the duplicate copy of the serial information signals;
      a processor coupled to the serial port receiver circuit and configured to monitor the duplicate copy of the serial information signals to detect a predetermined serial control sequence; and
      a switch control circuit for controlling a switching of power within said host server, wherein said switch control circuit is coupled to said processor and is configured to generate a control signal to selectively power-on said host server in response to said processor detecting said predetermined serial control sequence, wherein said serial port receiver circuit, said processor, and said switch control circuit are contained in a third housing separate from the first and second housings, and wherein power for powering said host server is not propagated through said third housing.

10. The networked computer system as recited in claim 9, wherein the serial port receiver circuit further converts the serial information signals into information signals having voltage levels readable by the processor.

11. The networked computer system as recited in claim 9, wherein the switch control circuit includes a relay switch alternatively coupled to a first and second signal lines coupled to the power connector of the host server, wherein the relay switch allows a predetermined voltage applied to the first signal line to power-on the host server and the relay switch allows the predetermined voltage to be applied to the second signal line in order to power-off the host server.

12. The networked computer system as recited in claim 9, wherein the power control system further comprising a power source coupled to provide power to said processor.

13. The networked computer system as recited in claim 12, wherein the power source includes a primary power source and an alternative power source.

14. The networked computer system as recited in claim 13, wherein the primary power source includes a five-volt power supply coupled to an AC-to-DC converter.

15. The networked computer system as recited in claim 13, wherein the alternate power source includes a nickel cadmium cell coupled to an AC-to-DC converter.

16. The networked computer system as recited in claim 12, wherein the power source further comprises a maintenance lockout switch for disabling the power control system from controlling the power supplied to said first device.

17. An apparatus for controlling a power status of a remote device, said apparatus comprising:
   a monitoring circuit configured to monitor signals transmitted on a communication line coupled to the remote device;
   a processor coupled to the monitoring circuit and configured to process the signals;
   a switch coupled to the processor and the remote device, said switch configured to alter the power status of the remote device in response to the processed signals; and
   a maintenance lockout switch for disabling the apparatus from controlling the power status of the remote device, wherein said maintenance lockout switch is coupled to said monitoring circuit, said processor, and said switch.

18. An apparatus for controlling a power status of a remote device, said apparatus comprising:
   a monitoring circuit configured to monitor signals transmitted on a communication line coupled to the remote device;
   a processor coupled to the monitoring circuit and configured to process the signals;
   a switch coupled to the processor and the remote device, said switch configured to alter the power status of the remote device in response to the processed signals; and
   a power source for providing power to said monitoring circuit said processor, and said switch, wherein said power source comprises a main power source and an alternate power source, wherein said main power source obtains power from an AC adapter, and wherein said alternate power source provides said power if said main power source is disconnected.

19. An apparatus for controlling a power status of a remote device, said apparatus comprising:
   a monitoring circuit configured to monitor signals transmitted on a communication line coupled to the remote device;
   a processor coupled to the monitoring circuit and configured to process the signals;
   a switch coupled to the processor and the remote device, said switch configured to alter the power status of the remote device in response to the processed signals; and
   a power source for providing power to said monitoring circuit, said processor, and said switch, wherein said power source comprises a main power source and an alternate power source, wherein said main power source obtains power from a keyboard port of the remote device, and wherein said alternate power source provides said power if said main power source is disconnected.

* * * * *

UNITED STATES PATENT AND TRADEMARK OFFICE
CERTIFICATE OF CORRECTION

PATENT NO. : 6,269,288 B1 Page 1 of 1
DATED : July 31, 2001
INVENTOR(S) : Robert L. Smith It is certified that error appears in the above-identified patent and that said Letters Patent is hereby corrected as shown below:

<u>Column 8,</u>
Line 63, please replace "claim 3" with -- claim 6 --.

Signed and Sealed this

Twenty-first Day of June, 2005

JON W. DUDAS
*Director of the United States Patent and Trademark Office*